July 8, 1924.
S. I. FEKETE ET AL
1,500,305
PEDAL FOR AUTOMOBILES
Filed Aug. 2, 1923
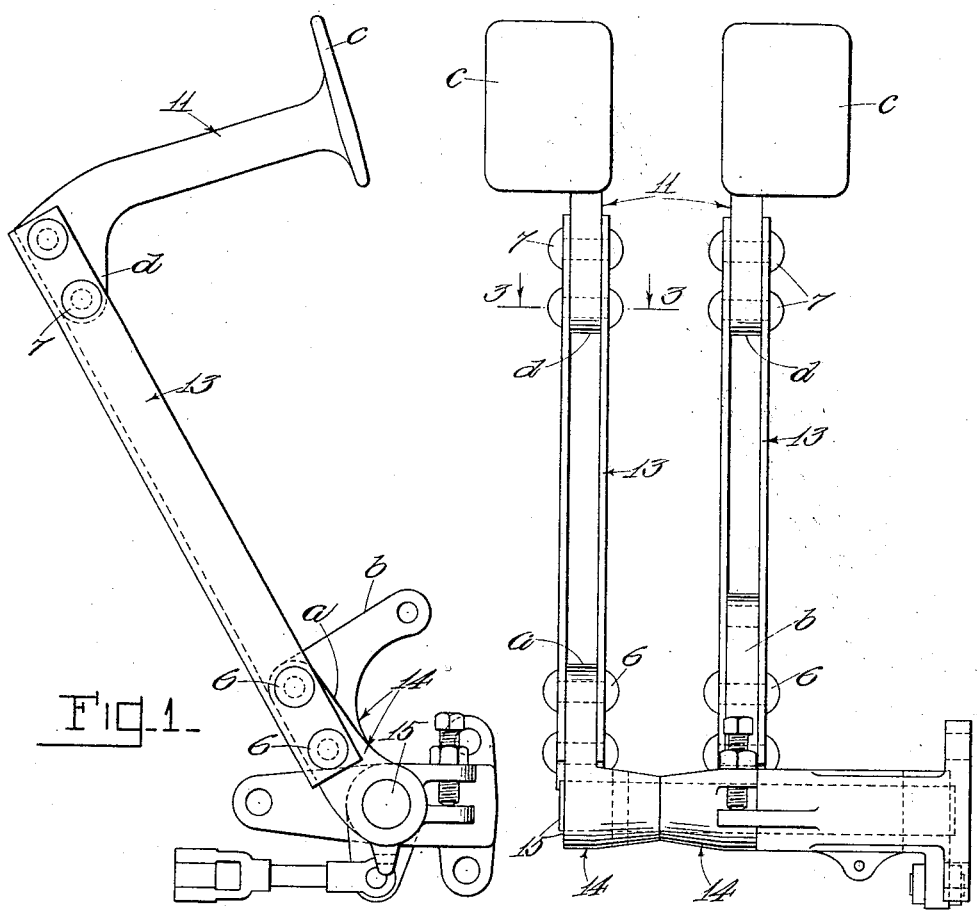
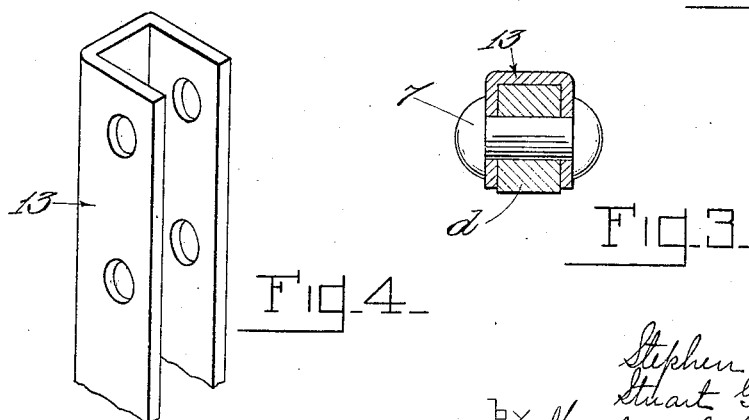

Patented July 8, 1924.

1,500,305

UNITED STATES PATENT OFFICE.

STEPHEN I. FEKETE AND STUART G. BAITS, OF DETROIT, MICHIGAN, ASSIGNORS TO HUDSON MOTOR CAR COMPANY, OF DETROIT, MICHIGAN, A CORPORATION OF MICHIGAN.

PEDAL FOR AUTOMOBILES.

Application filed August 2, 1923. Serial No. 655,260.

*To all whom it may concern:*

Be it known that we, STEPHEN I. FEKETE and STUART G. BAITS, citizens of the United States, residing at Detroit, county of Wayne, State of Michigan, have invented a certain new and useful Improvement in Pedals for Automobiles, of which the following is a specification, reference being had therein to the accompanying drawings.

The invention has for its object to provide a new and improved pedal capable for use for the clutch or brakes of an automobile and in similar places, the particular object being to provide a pedal which can be made at less expense than those heretofore commonly employed and which will give equally good service. Heretofore clutch and brake pedals have ordinarily been made from a single forging which requires expensive dies and machining operations and therefore the expense has been relatively large. As both the brake and its pedal are essential parts of an automobile on which the safety of the occupants of the vehicle depends, the use of forgings has always been thought necessary in vehicles of the better class. The construction embodying the present invention however does away with this necessity while at the same time affording a clutch pedal having an ample margin of strength for perfect safety.

The invention will be fully understood from the following description when taken in connection with the accompanying drawings, and the novel features thereof will be pointed out and clearly defined in the claims at the close of this specification.

In the drawings, Fig. 1 is a side elevation of a pedal and connected parts embodying the invention.

Fig. 2 is a rear elevation of the parts shown in Fig. 1.

Fig. 3 is a section on line 3—3, Fig. 2.

Fig. 4. is a perspective of the channel member.

Referring to the drawings, the brake pedal embodying our invention consists essentially of three members, the foot plate 11, the channel member 13 and the combined sleeve and arm 14. The sleeve and arm 14 is drilled to receive the cross shaft 15 and may be of any convenient shape. In Fig. 2 there are shown two pedals, the left hand pedal being the clutch pedal and the right hand one being the brake pedal. For the clutch pedal the sleeve and arm 14 is made as shown in Figs. 1 and 2 the arm being designated $a$; for the brake pedal which requires a different point of connection with the operating mechanism the sleeve and arm is made as shown at $b$; otherwise the two pedals are the same in construction. The channel member 13 is straight and receives the end of the arm $a$ or $b$, as the case may be, partly surrounding it, the two parts being secured together by rivets 6. The foot plate is either a right or a left to permit the pedals to be placed closer together. The foot plate comprises the plate member proper $c$ and an arm $d$ which is substantially at right angles to the length of the foot plate. The arm $d$ also lies within the channel and is riveted in place by rivets 7.

The channel member because of the distribution of metal in it has ample strength and stiffness for the strains to which it is subjected. The foot plate is not subjected to any considerable strains and therefore can be made of a malleable casting, the sleeve and arm can also be made of a malleable casting but if preferred can be made of a forging. Under ordinary circumstances it is possible, however, to obtain ample strength from a malleable casting. It will also be seen that practically no machining except drilling of the several holes is required, and since the pedal is made of relatively inexpensive materials the total expense is much less than for a forged pedal.

What we claim is:

1. The improved pedal for automobiles which comprises an arm for engagement with a cross shaft, a channel member secured at one end to said arm and a foot plate member secured to the other end of said channel member.

2. The improved pedal for automobiles which comprises an arm on a cross shaft, a channel member, said arm lying within said channel and being secured thereto, a foot plate member having a portion extending at right angles to its general length, said portion lying within the channel at its other end and secured thereto.

In testimony whereof we affix our signatures.

STEPHEN I. FEKETE.
STUART G. BAITS.